US010089656B1

(12) United States Patent
Sanio et al.

(10) Patent No.: US 10,089,656 B1
(45) Date of Patent: Oct. 2, 2018

(54) CONDUCTING A SECOND AUCTION FOR LOAD ORDER

(71) Applicant: Google LLC, Mountain View, CA (US)

(72) Inventors: Jason Robert Richard Sanio, Mountain View, CA (US); Courtney Hampson, Mountain View, CA (US)

(73) Assignee: Google LLC, Mountain View, CA (US)

(*) Notice: Subject to any disclaimer, the term of this patent is extended or adjusted under 35 U.S.C. 154(b) by 1016 days.

(21) Appl. No.: 14/332,574

(22) Filed: Jul. 16, 2014

(51) Int. Cl.
*G06Q 30/02* (2012.01)

(52) U.S. Cl.
CPC .......................... *G06Q 30/0275* (2013.01)

(58) Field of Classification Search
CPC combination set(s) only.
See application file for complete search history.

(56) References Cited

U.S. PATENT DOCUMENTS

| 8,204,818 | B1 | 6/2012 | Aggarwal | |
|---|---|---|---|---|
| 2001/0021923 | A1* | 9/2001 | Atkinson | G06Q 30/0601 705/37 |
| 2004/0267806 | A1* | 12/2004 | Lester | G06Q 30/02 |
| 2006/0095281 | A1* | 5/2006 | Chickering | G06Q 30/02 705/37 |
| 2009/0326966 | A1* | 12/2009 | Callaghan | G06Q 30/02 705/1.1 |
| 2010/0023406 | A1* | 1/2010 | Bhogal | G06Q 30/02 705/14.66 |
| 2011/0035263 | A1* | 2/2011 | Ramanathan | G06F 3/0485 705/14.4 |
| 2011/0191168 | A1 | 8/2011 | Schroedl et al. | |

OTHER PUBLICATIONS

Dubey et al, Co-operative Content Adaptation Framework, May 17, 2013, WWW 2013 Companion, p. 221-222. (Year: 2013).*
'BannerFlow' [online]. "Multi-Screen Advertising—Build Once, Run Anywhere," publically, available before Jul. 16, 2014 [retrieved on Sep. 11, 2014]. Retrieved from the Internet: URL<http://www.bannerflow.com/features/all/responsive-ads>, 11 pages.
'Webmaster World' [online]. "CSS Forum: Forcing an Ad to Load First," Feb. 21, 2007 [retrieved on Sep. 11, 2014]. Retrieved from the Internet: URL<http://www.webmasterworld.com/css/3265748.htm>, 4 pages.

* cited by examiner

*Primary Examiner* — Marie P Brady
(74) *Attorney, Agent, or Firm* — Fish & Richardson P.C.

(57) ABSTRACT

Methods, systems, and apparatus include computer programs encoded on a computer-readable storage medium for conducting a selection process for load order. A method includes: identifying a plurality of winners of a first selection process for displaying content in a block including identifying first and second winning content items and an associated placement of the first and second content items in the block; determining when the first content item or second content item has a bid specified for a load order for the block; when both the first and the second content item have a bid specified for load order, conducting a selection for load order based on the respective bids; determining a winner of the selection and enabling the winner to load first when the block is rendered on a user device; and charging the winner based at least in part on the bids.

13 Claims, 5 Drawing Sheets

CONDUCTING A SECOND AUCTION FOR LOAD ORDER

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Slots can be allocated to content sponsors through a reservation system or an auction. For example, content sponsors can provide bids specifying amounts that the sponsors are respectively willing to pay for presentation of their content. In turn, a reservation can be made or an auction can be performed, and the slots can be allocated to sponsors according, among other things, to their bids and/or the relevance of the sponsored content to content presented on a page hosting the slot or a request that is received for the sponsored content.

SUMMARY

In general, one innovative aspect of the subject matter described in this specification can be implemented in methods that include a method for conducting a selection process for load order. The method comprises: identifying a plurality of winners of a first selection process for displaying content in a block including identifying first and second winning content items and an associated placement of the first and second content items in the block; determining when the first content item or second content item has a bid specified for a load order for the block; when both the first and the second content item have a bid specified for load order, conducting a selection for load order based on the respective bids; determining a winner of the selection and enabling the winner to load first when the block is rendered on a user device; and charging the winner based at least in part on the bids.

In general, another aspect of the subject matter described in this specification can be implemented in computer program products. A computer program product is tangibly embodied in a computer-readable storage device and comprises instructions. The instructions, when executed by a processor, cause the processor to: identify a plurality of winners of a first selection process for displaying content in a block including identifying first and second winning content items and an associated placement of the first and second content items in the block; determine when the first content item or second content item has a bid specified for a load order for the block; when both the first and the second content item have a bid specified for load order, conduct a selection for load order based on the respective bids; determine a winner of the selection and enabling the winner to load first when the block is rendered on a user device; and charge the winner based at least in part on the bids.

In general, another aspect of the subject matter described in this specification can be implemented in systems. A system includes one or more processors and one or more memory elements including instructions. The instructions, when executed, cause the one or more processors to: identify a plurality of winners of a first selection process for displaying content in a block including identifying first and second winning content items and an associated placement of the first and second content items in the block; determine when the first content item or second content item has a bid specified for a load order for the block; when both the first and the second content item have a bid specified for load order, conduct a selection for load order based on the respective bids; determine a winner of the selection and enabling the winner to load first when the block is rendered on a user device; and charge the winner based at least in part on the bids.

These and other implementations can each optionally include one or more of the following features. The first selection process can be a first auction and the selection can be a second, different auction. The first auction can include one or more participants from inventory and the first and second content items and the second, different auction can include only the plurality of winners. Determining when the first or second content items have bids specified for loading can include determining that a campaign associated with a respective winner includes a designation to compete in the second, different auction and specifies the bid. The first content item can be associated with a highest position in the block, the second content item can be associated with a next highest position in the block, and determining a winner can include evaluating the bids associated with the first and second content items and when a bid for the second content item is greater than a bid for the first content item, enabling the second content item that is to be positioned in the next highest position in the block to be rendered before the first content item is rendered for presentation in the highest position in the block. Enabling the winner to load first can include modifying HTML code associated with the block to include a DIV tag in association with the winner so that the winner loads before other content in the block rather than from highest position to lesser positions when rendering the block.

A determination can be made as to when the block is visible on a page that is to be presented on a user device. When the block is not visible at a time of rendering, the winner might not be charged. The block can be a block on a resource that includes plural slots available for filling by a content serving system and the resource can include native content and a plurality of blocks for inclusion of third party content. Charging a winner can include charging the winner no charge when only one of the first and second content items is associated with a bid for load order. Charging a winner can include charging a winner based on a losing bid of the bids for load order. An indication can be received of a desire to bid on load order in association with a campaign, the campaign including a first bid for use when determining whether to select a respective content item in the first selection process. A second bid can be received for use in determining load order. The first and second bids can be stored in the campaign.

Particular implementations may realize none, one or more of the following advantages. Content sponsors can bid to have a content item of a winning campaign load first in a content block that includes multiple content items, even when the content item is not a highest ranked item of the multiple content items. A content management system can receive revenue for selecting a content item among other content items to load first in a content block.

The details of one or more implementations of the subject matter described in this specification are set forth in the accompanying drawings and the description below. Other

BRIEF DESCRIPTION OF THE DRAWINGS

Like reference numbers and designations in the various drawings indicate like elements.

DETAILED DESCRIPTION

A first selection process for displaying content in a block can be conducted. A plurality of winners of the first selection process including first and second winning content items can be identified. An associated placement of the first and second content items in the block can also be identified. A determination can be made that the first content item and/or second content item has a bid specified for a load order for the block. When both the first and the second content item have a bid specified for load order, a selection for load order can be conducted based on the respective bids. A winner of the selection can be determined and the winner can be enabled to load first when the block is rendered on a user device, irrespective of their position as a result of the first selection process. The winner can be determined based at least in part on the bids.

For situations in which the systems discussed here collect information about users, or may make use of information about users, the users may be provided with an opportunity to control whether programs or features collect user information (e.g., information about a user's social network, social actions or activities, profession, demographics, a user's preferences, or a user's current location), or to control whether and/or how to receive content from a content server that may be more relevant to the user. In addition, certain data may be treated in one or more ways before it is stored or used, so that certain information about the user is removed. For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information about the user is collected and used by a content server.

Figure 1:
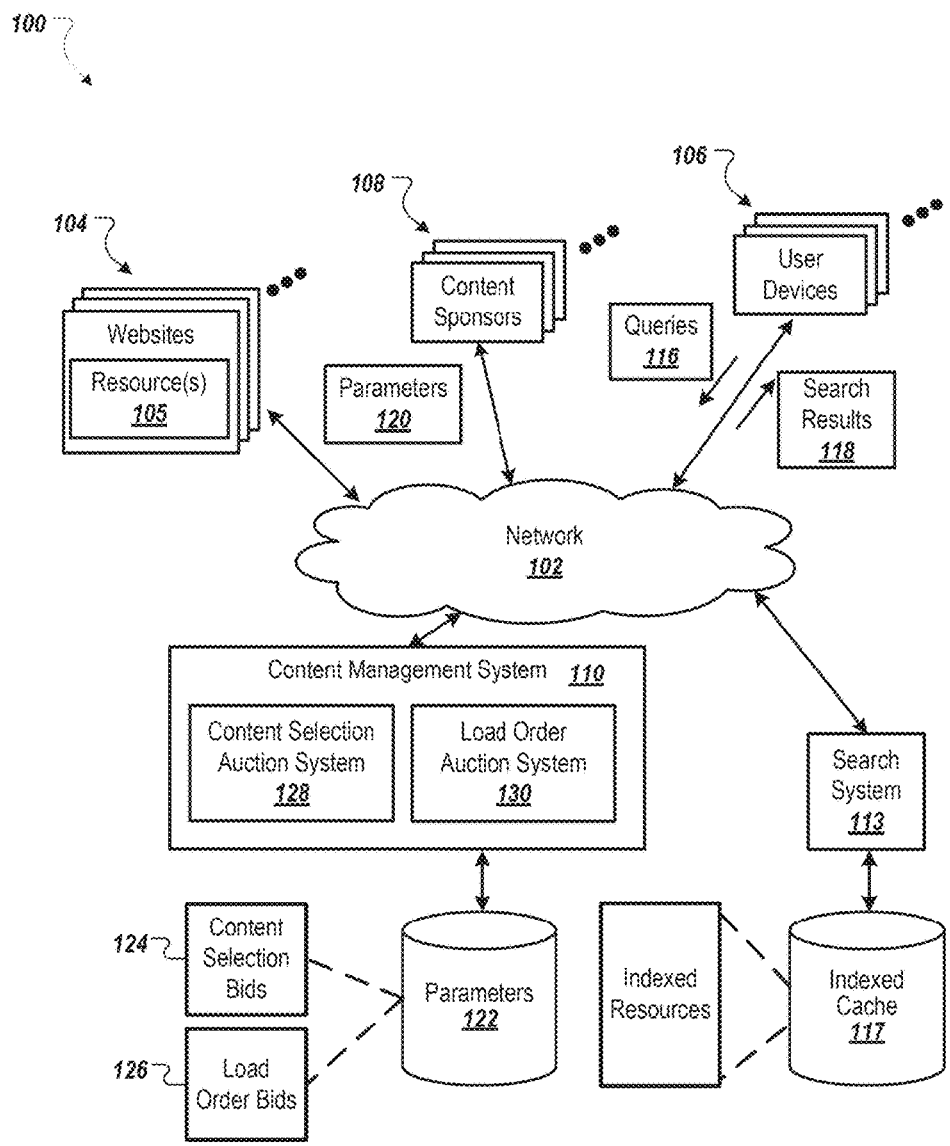
FIG. 1 is a block diagram of an example environment for providing content to a user.

FIG. 1 is a block diagram of an example environment 100 for providing content to a user. The example environment 100 includes a network 102, such as a local area network (LAN), a wide area network (WAN), the Internet, or a combination thereof. The network 102 connects websites 104, user devices 106, content sponsors 108, publishers, a content management system 110 and a search system 113. The example environment 100 may include many thousands of websites 104, user devices 106, and content sponsors 108. The content management system 110 may be used for selecting and providing content in response to requests for content. The content sponsors 108 can be, for example, advertisers. Other types of content sponsors are possible.

A website 104 includes one or more resources 105 associated with a domain name and hosted by one or more servers. An example website 104 is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources 105 include HTML pages, word processing documents, portable document format (PDF) documents, images, video, and news feed sources, to name only a few. The resources 105 can include content, such as words, phrases, videos, images and sounds, that may include embedded information (such as meta-information hyperlinks) and/or embedded instructions (such as scripts).

A user device 106 is an electronic device that is under control of a user and is capable of requesting and receiving resources 105 over the network 102. Example user devices 106 include personal computers, tablet computers, mobile communication devices (e.g., smartphones), televisions, set top boxes, personal digital assistants and other devices that can send and receive data over the network 102. A user device 106 typically includes one or more user applications, such as a web browser, to facilitate the sending and receiving of data over the network 102. The web browser can interact with various types of web applications, such as a game, a map application, or an e-mail application, to name a few examples.

A user device 106 can request resources 105 from a website 104. In turn, data representing the resource 105 can be provided to the user device 106 for presentation by the user device 106. User devices 106 can also submit search queries 116 to the search system 113 over the network 102. In response to a search query 116, the search system 113 can, for example, access an indexed cache 117 to identify resources 105 that are relevant to the search query 116. The search system 113 identifies the resources 105 in the form of search results 118 and returns the search results 118 to the user devices 106 in search results pages. A search result 118 is data generated by the search system 113 that identifies a resource 105 that is responsive to a particular search query 116, and can include a link to the resource 105. An example search result 118 can include a web page title, a snippet of text or a portion of an image extracted from the web page, and the URL (Unified Resource Location) of the web page.

The data representing the resource 105 or the search results 118 can also include data specifying a portion of the resource 105 or search results 118 or a portion of a user display (e.g., a presentation location of a pop-up window or in a slot of a web page) in which other content (e.g., advertisements) can be presented. These specified portions of the resource or user display are referred to as slots or impressions. An example slot is an advertisement slot.

When a resource 105 or search results 118 are requested by a user device 106, the content management system 110 may receive a request for content to be provided with the resource 105 or search results 118. The request for content can include characteristics of one or more slots or impressions that are defined for the requested resource 105 or search results 118. For example, a reference (e.g., URL) to the resource 105 or search results 118 for which the slot is defined, a size of the slot, and/or media types that are available for presentation in the slot can be provided to the content management system 110. Similarly, keywords associated with a requested resource 105 or a search query 116 for which search results 118 are requested can also be provided to the content management system 110 to facilitate identification of content that is relevant to the resource 105 or search query 116. An identifier (e.g., cookie) associated with the user device 106 can be received with the request for content.

Based, for example, on data included in the request for content, the content management system 110 can select content items that are eligible to be provided in response to the request. One or more selected content items can be provided to the user device 106 in association with providing an associated resource 105 or search results 118. The provided content item(s) can be presented on the user device 106, in one or more respective slots.

The content management system 110 can, for example, select a content item having characteristics matching the characteristics of a given slot. As another example, content items having selection criteria (e.g., keywords) that match resource keywords in the search query 116 or keywords included in the search results 118 may be selected as eligible content items by the content management system 110. As yet another example, the content management system 110 can identify a content item that is associated with a keyword that matches a keyword included in a user profile associated with the requesting user device 106.

A content sponsor 108 or content sponsor can create a content campaign associated with one or more content items using tools provided by the content management system 110. For example, the content management system 110 can provide one or more account management user interfaces for creating and managing content campaigns. The account management user interfaces can be made available to the content sponsor 108, for example, either through an online interface provided by the content management system 110 or as an account management software application installed and executed locally at a content sponsor's client device.

A content sponsor 108 can, using the account management user interfaces, provide campaign parameters 120 which define a content campaign. The content campaign can be created and activated for the content sponsor 108 according to the parameters 120 specified by the content sponsor 108. Campaign parameters 120 can include, for example, a campaign name, a preferred content network for placing content, a budget for the campaign, start and end dates for the campaign, a schedule for content placements, content (e.g., creatives), bids for selection of content items, and selection criteria. Selection criteria can include, for example, a language, one or more geographical locations or websites, and one or more selection terms. Bids for selection of content items can be amounts that the content sponsors 108 are respectively willing to pay for presentation of their content items.

As described in more detail below, content sponsors can also provide one or more second bids for bidding on load order of content item(s). These bids can be in addition to first bids made as a part of an initial selection process to determine which content will be shown responsive to a received request for content. A content sponsor 108 can bid on load order, for example, when the content sponsor 108 desires that their content item is loaded before other content items. Such early loading may be advantageous, such as when a user device 106 has a network connection speed which results in a noticeable amount of time (e.g., multiple seconds) for multiple content items to load on a resource 105. A content item that loads first, for example, is visible to the user for a longer period of time, and such exposure may be valuable to a content sponsor 108 (e.g., a value on which the content sponsor 108 may bid). The campaign parameters (including first and second bids) 120 can be stored in a parameters data store 122. For example, the parameters data store 122 includes content selection bids 124 and load order bids 126.

In some implementations, a content selection auction system 128 selects content items based at least in part on results of a content selection auction. For example, the content selection auction can be performed and slots can be allocated to content sponsors 108 according, among other things, to their content selection bids and/or the relevance of a content item to content presented on a page hosting the slot or a request that is received for the content item. For example, when a slot is being allocated in the content selection auction, the slot can be allocated to the content sponsor 108 that provided the highest content selection bid and/or a highest auction score (e.g., a score that is computed as a function of a content selection bid and/or a quality measure). When multiple slots are allocated in a single auction, the slots can be allocated to a set of bidders that provided the highest content selection bids and/or have the highest auction scores.

When multiple slots are allocated, the multiple slots can be grouped, for example, in a content block. In some implementations, the search system 113 (or other system) identifies and stores information about content blocks, such as during one or more crawling processes. When a content request is received that is associated with a content block that includes multiple slots, a group of winning content items can be identified for the content block, with each winning content item being a winner of a respective content slot within the content block. The content selection auction system 128 can identify an associated placement of winning content items in the content block. For example, the content block may include a vertical arrangement of content slots, and the winning content items can be placed in the content block from highest to lowest positions in the block according to respective auction scores. In some implementations, a resource 105 (e.g., web page) can include one or more content blocks, such as when the resource 105 includes multiple content slots. In some implementations, a block is not required to be contiguous, that is, the positions in a given block may not be all located together. (e.g., one block may include plural slots that are spread at different locations on a given resource). In some implementations, a resource 105 can include multiple content blocks.

A load order auction system 130 can determine that one or more winning content items have a bid specified for a load order for the block. The load order auction system 130 can conduct, for example, a second auction for load order based on respective load order bids. A winning content item (or, in some implementations, a load ordering of content items) of the second auction can be determined. The winning content item (of the second selection process from among the winners of the first selection process) can be enabled to load first when the block is rendered on a user device 106. As will be discussed in greater detail below, the load ordering can be the same or different than the ordering determined in the first selection process.

Figure 2:
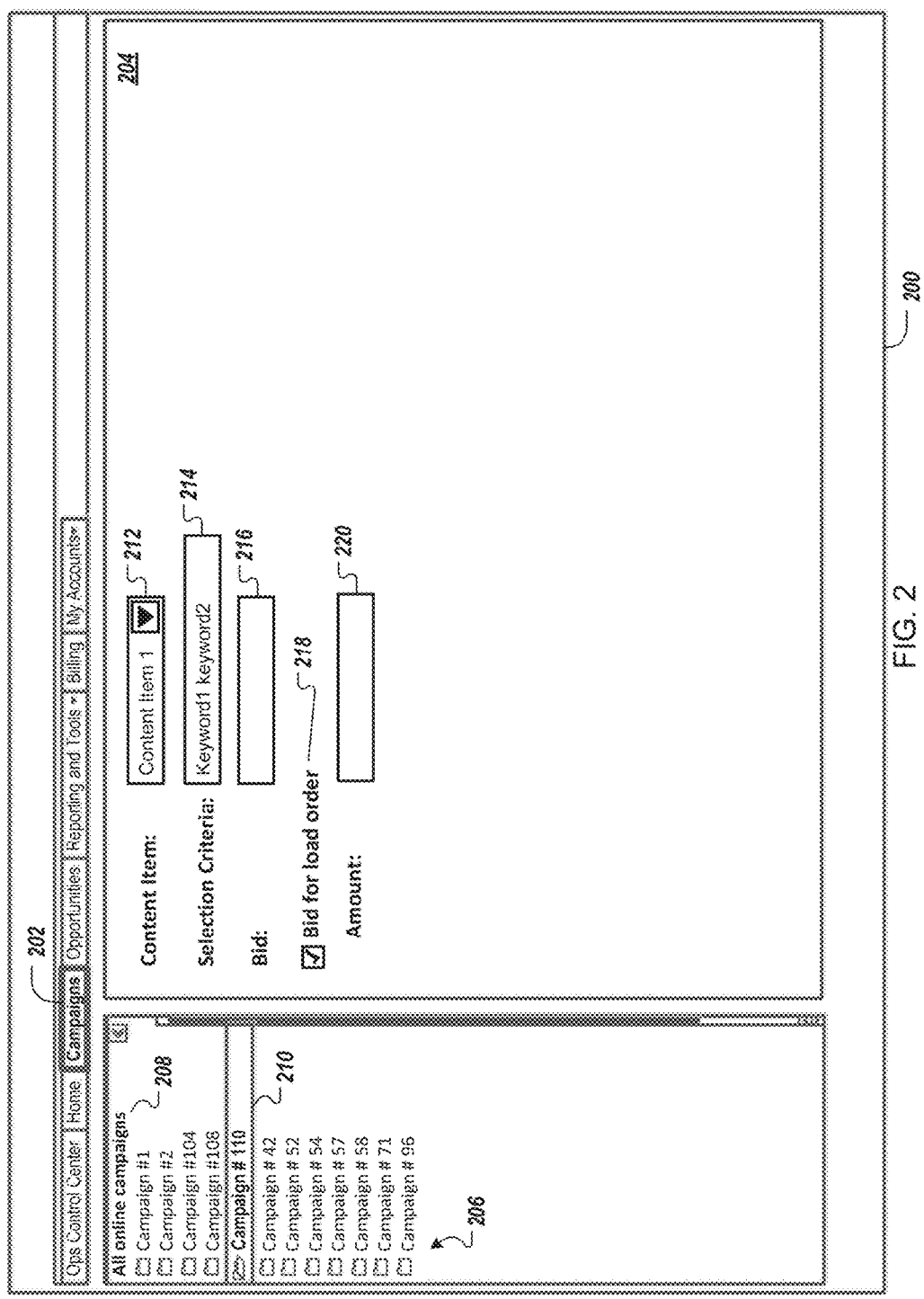
FIG. 2 illustrates an example campaign management user interface.

FIG. 2 illustrates an example campaign management user interface 200. The user interface 200 can be included, for example, in one or more user interfaces that a user, such as a content sponsor, can use to configure a campaign. The content sponsor can select a tab 202 to display a campaign configuration area 204. The content sponsor can view a list 206 of campaigns by selecting a control 208. The content sponsor can edit an existing campaign in the campaign configuration area 204 by selecting the name of an existing campaign (e.g., a name 210) in the campaign list 206.

A content item included in the campaign can be selected using a content item selection control 212. Selection criteria and a bid for selection of the content item for presentation in response to a request for content can be configured using a selection criteria control 214 and a first bid control 216, respectively. The content sponsor can select an option control 218 to indicate that the content item is eligible to participate in a selection process for load order (e.g., load order of content items in a block). A bid for the load order selection can be configured using a second bid control 220. In some implementations, the load order bid can be specified based on (e.g., a percentage of) the bid for selection of the content item.

In some implementations, the user interface 200 enables a content sponsor to bid for load order for content requests, such as requests received from a user device with a network connection speed below a threshold. Although the user interface 200 enables to specify a load order bid for a particular content item, in some implementations, a load order bid can be configured on a content sponsor, campaign, or content group basis.

In some implementations, the user interface 200 enables a content sponsor to specify different load order bids based on different content item placement positions in which a content item might be placed in a content block or based on other criteria (e.g., connection speed). For example, a content sponsor can specify first, second, and third load order bids to use for a content item when the content item is positioned in a first, second, or third position in the content block. For example, the first load order bid can be twenty cents, the second load order bid can be fifty cents, and the third load order bid can be fifteen cents. A given content item may load first when in the first placement position if no other winning content items provide load order bid(s) (e.g., when no other content items have a load order bid). A content sponsor associated with a "first" position content item can be encouraged to bid in the second selection process, so as to compete with other content sponsors for having the content item load first.

Figure 3:
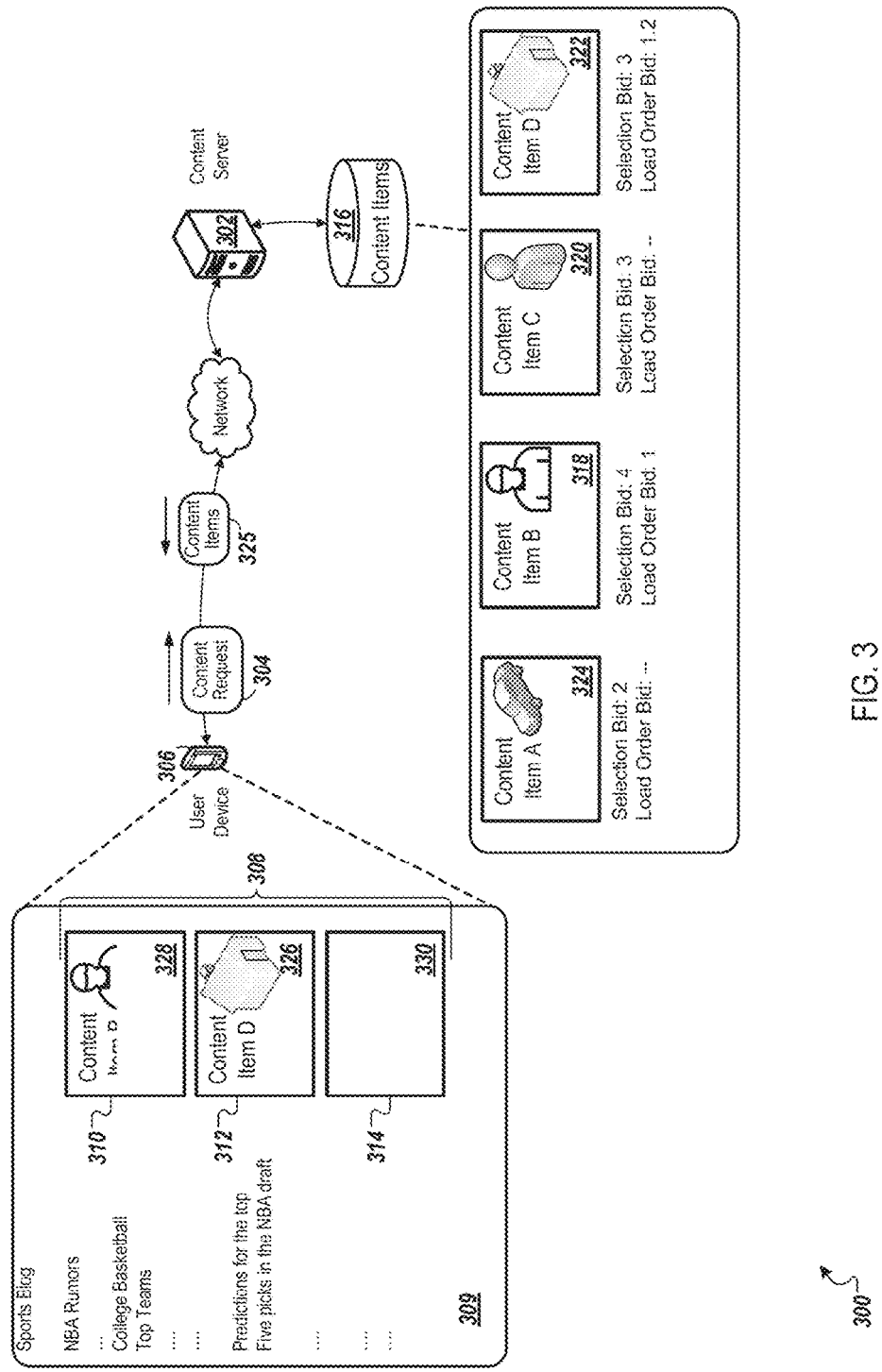
FIG. 3 is a block diagram of an example system for conducting a selection process for load order.

FIG. 3 is a block diagram of an example system 300 for conducting a selection process for load order. A content server 302 can receive a request for content 304 from a user device 306 for a block 308 included in a presented resource 309. The block 308 includes content slots (e.g., positions) 310, 312, and 314. The content server 302 can conduct a selection process (e.g., a first auction) for the content slots 310, 312, and 314. The selection process can include the identifying of three winning content items for the content slots 310, 312, and 314 and an associated placement (e.g., top to bottom) of the winning content items within the block 308.

For example, the content server 302 can identify, from a content items repository 316, content items B 318, C 320, and D 322 (e.g., based on respective bids for the first auction of four, three, and three, respectively). Although bids are illustrated, winners of the first auction can be determined in other ways, such as based on auction scores that are determined based on respective bids times respective quality scores. In the example of FIG. 3, a content item A 324 included in the content items repository 316 is not selected as a winner of the first auction. The content server 302 can determine an associated placement order for the winning content items, such as based on respective bids or some other type of auction score. For example, the content server 302 can determine a placement order (e.g., from top to bottom in the block 308) of the content item B 318, the content item D 322, and the content item C 320.

The content server 302 can determine when one or more of the winning content items has an associated bid for load order within a block in which a respective content item is displayed. For example, the content server 302 can determine that the content item B 318 and the content item D 322 each have a bid associated with load order. The content item B 318 has a load order bid of 1.0 and the content item D 322 has a load order bid of 1.2.

In some implementations, the content server 302 determines when one or more of the winning content items has an associated bid for load order when one or more content items to present includes non-textual content (e.g., image content, video content). For example, when all content items to present include only textual content, latency of loading the content items may not be an issue, even over slower network connections. When all content items to present include only textual content, the content server 302 might not perform a selection process for load order.

The content server 302 can, based on determining that multiple winning content items of the first auction have associated load order bids, conduct a selection process (e.g., a second auction) for load order based on the respective bids. For example, the content server 302 can determine that the content item D 322 is the winner of the second auction. The content server 302 can enable the content item D 322 to load first when the block 308 is rendered on the user device 306. For example, the content server 302 can modify HTML code associated with the block 308 to include a DIV tag in association with the content item D 322 so that the content item D 322 loads before other content in the block 308 rather than from a highest position to lesser positions when rendering the block 308.

The content server 302 can provide the content items B 318, C 320, and D 322, along with, for example, code for the block 308, to the user device 306 (e.g., as illustrated by provided content items 325). An application (e.g., browser) running on the user device 306 can render the content items according to the received HTML code. For example, a presented content item 326 corresponding to the content item D 322 can be loaded first, even though the associated content slot 312 is below a topmost content slot 310. A presented content item 328 corresponding to the content item B 318 (e.g., shown partially loaded) can be loaded after the presented content item 326 is loaded. A provided content item corresponding to the content item C 330 can be loaded in the content slot 314 after the loading of the presented content item 328 finishes.

The content server 302 can charge a content sponsor associated with the content item D 322 based on the load order bids associated with the second auction. For example, the content server 302 can charge based on a highest losing bid (e.g., a second price bid) of the bids for load order. For example, the content sponsor can be charged the bid of 1.0 associated with the content item B 318. The content sponsor associated with the content item D 322 can also be charged a separate amount (e.g., a bid of three for the first auction) for placement of the content item D on the resource 309.

Figure 4:
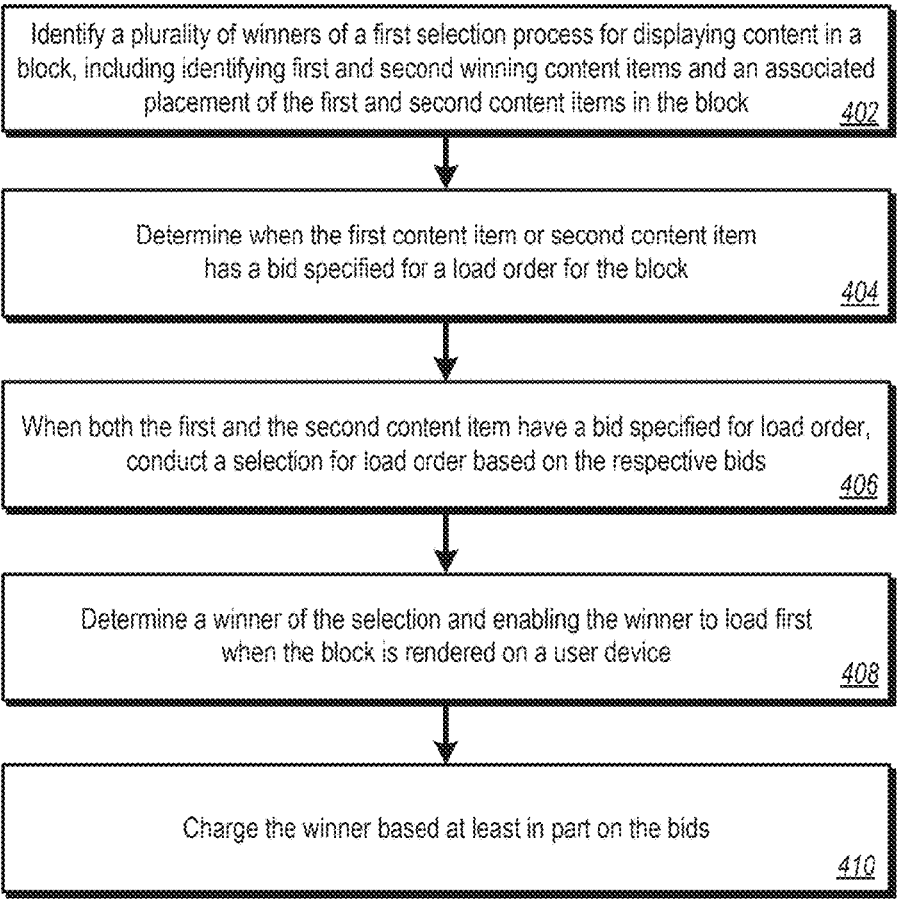
FIG. 4 is a flowchart of an example process for conducting a selection process for load order.

FIG. 4 is a flowchart of an example process 400 for conducting a selection process for load order. The process 400 can be performed, for example, by the content management system 110 described above with respect to FIG. 1. The process 400 is described as being performed for a content block (e.g., a content block included in a resource). In some implementations, the process 400 can be performed for each of multiple slots or content blocks included in a resource.

A plurality of winners of a first selection process for displaying content in a block is identified (402), including the identifying of first and second winning content items and an associated placement of the first and second content items in the block. The first selection process can be, for example, a first auction. The first auction can include one or more participants from inventory and the first and second content items. The block can be, for example, a block on a resource that includes plural slots available for filling by a content serving system. The resource can include, for example, native content and a plurality of blocks for inclusion of third party content.

A determination is made that the first content item or second content item has a bid specified for a load order for the block (404). For example, a determination can be made that a campaign associated with a respective winner includes a designation to compete in a second, different auction for load order. The designation can specify the bid for load order.

When a plurality of the winning bids in the first selection process (e.g., both the first and the second content items) have a bid specified for load order, a selection for load order is conducted based on the respective bids (406). The selection can be, for example, the second, different auction for load order. The second, different auction can include only the plurality of winners of the first auction and only items that included bids specified for load order.

A winner of the selection is determined and the winner is enabled to load first when the block is rendered on a user device (408). Enabling the winner to load first can include modifying HTML code associated with the block to include a DIV tag in association with the winner so that the winner loads before other content in the block rather than from a highest position to lesser positions when rendering the block. For example, the first content item can be associated with a highest (e.g., first) position in the block and the second content item can be associated with a next highest (e.g., second highest) position in the block. The bids for load order associated with the first and second content items can be evaluated and when a bid for the second content item is greater than a bid for the first content item, the second content item that is to be positioned in the second position can be enabled to be rendered before the first content item is rendered for presentation in the first position.

The winner is charged based at least in part on the bids (410). For example, the content sponsor of the winning content item can be charged based at least in part on the bids. In some implementations, the winner is charged a price equal to the bid for load order for the winning content item. In some implementations, the winner is charged based on a losing bid of the bids for load order. For example, the content sponsor of the winning content item can be charged a price equal to the second-highest bid (e.g., highest losing bid) for load order in the second auction. In some implementations, the winner is not charged when only one of the first and second content items is associated with a bid for load order. In some implementations, a determination is made as to when the block is visible on a page that is to be presented on a user device. When the block is not visible at a time of rendering, the winner might not be charged.

Figure 5:
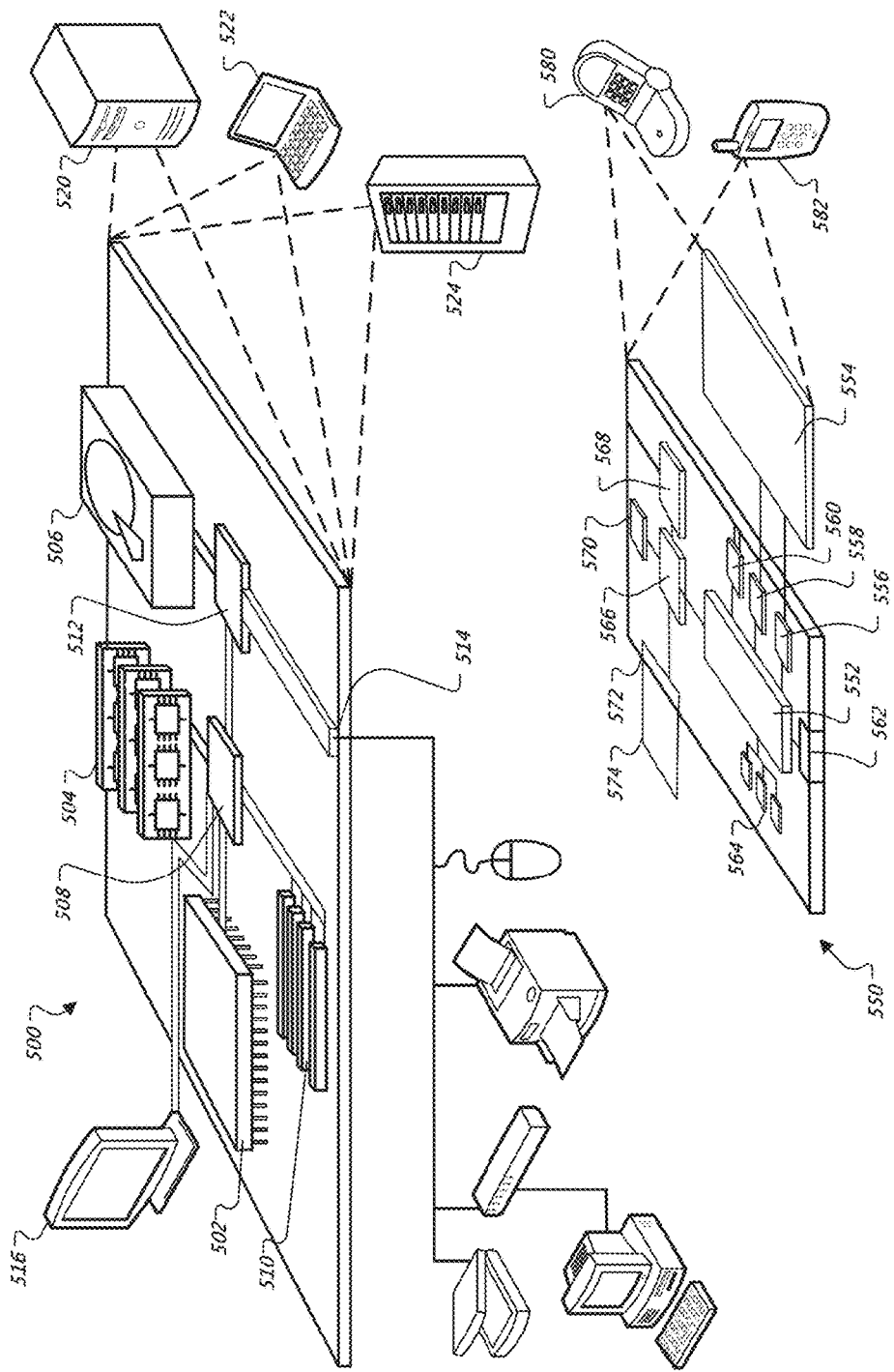
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be illustrative only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a computer-readable medium. The computer-readable medium is not a propagating signal. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is illustrative only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication (e.g., via a docking procedure) or for wireless communication (e.g., via Bluetooth or other such technologies).

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communication audibly using audio codec 560, which may receive spoken information from a user and convert it to usable digital information. Audio codex 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A method comprising:
   identifying a plurality of winners of a first selection process for displaying content in a block including identifying first and second content items and a placement of the first and second content items in the block, the placement indicating a highest position in the block for the first content item and a next highest position in the block for the second content item;
   determining that the first content item and the second content item each have a respective bid specified for a load order for the block;
   determining a first media type of the first content item and a second media type of the second content item;
   determining whether the first media type and the second media type are both text;
   in response to determining that one or both of the first media type and the second media type are not text, determining to perform the selection for load order;
   conducting a selection for load order based on the respective bids of the first content item and the second content item including determining that a respective bid for the second content item is greater than a respective bid for the first content item;
   determining that the second content item is a winner of the selection based on the determination that the respective bid for the second content item is greater than the respective bid for the first content item;
   enabling rendering of content for presentation such that the second content item that is to be positioned in the next highest position is instead rendered in the highest position before the first content item when the block is rendered on a user device, the enabling including modifying HTML (Hyper Text Markup Language) code included in the block to include a DIV (Division) tag for the second content item; and
   charging a content sponsor of the second content item based at least in part on the respective bids of the first content item and the second content item, wherein the selection for load order is not performed if both the first media type and the second media type are text.

2. The method of claim 1 wherein the first selection process is a first auction and wherein the selection for load order is a second, different auction, the first auction including one or more participants from inventory and the first and second content items and wherein the second, different auction includes only the plurality of winners.

3. The method of claim 1 wherein determining that the first content item and the second content item each have respective bids specified for load order further includes identifying respective campaigns for the first content item and the second content item that each include a designation to compete in the selection for load order and specify the respective bid of the first content item or the second content item.

4. The method of claim 1 wherein the block is a block on a resource that includes plural slots available for filling by a content serving system and wherein the resource includes native content and a plurality of blocks for inclusion of third party content.

5. The method of claim 1 wherein charging the content sponsor of the second content item includes charging the content sponsor of the second content item no charge when only one of the first and second content items has a bid for load order.

6. The method of claim 1 wherein charging the content sponsor of the second content item further includes charging the content sponsor of the second content item based on a losing bid of the bids for load order.

7. The method of claim 1 further comprising receiving an indication of a desire to bid on load order for a campaign, the campaign including a first bid for use when determining whether to select a respective content item in the first selection process, receiving a second bid for use in determining load order, and storing the first and second bids in the campaign.

8. A computer program product tangibly embodied in a computer-readable storage device and comprising instructions that, when executed by a processor, cause the processor to:
   identify a plurality of winners of a first selection process for displaying content in a block including identifying first and second content items and a placement of the first and second content items in the block, the placement indicating a highest position in the block for the first content item and a next highest position in the block for the second content item;
   determine that the first content item and the second content item each have a respective bid specified for a load order for the block;

determine a first media type of the first content item and a second media type of the second content item;

determine whether the first media type and the second media type are both text;

in response to determining that one or both of the first media type and the second media type are not text, determine to perform the selection for load order;

conduct a selection for load order based on the respective bids of the first content item and the second content item including determining that a respective bid for the second content item is greater than a respective bid for the first content item;

determine that the second content item is a winner of the selection based on the determination that the respective bid for the second content item is greater than the respective bid for the first content item;

enable rendering of content for presentation such that the second content item that is to be positioned in the next highest position is instead rendered in the highest position before the first content item when the block is rendered on a user device, the enabling including modifying HTML (Hyper Text Markup Language) code included in the block to include a DIV (Division) tag for the second content item; and charge a content sponsor of the second content item based at least in part on the respective bids of the first content item and the second content item, wherein the selection for load order is not performed if both the first media type and the second media type are text.

9. The product of claim 8 wherein the first selection process is a first auction and wherein the selection for load order is a second, different auction, the first auction including one or more participants from inventory and the first and second content items and wherein the second, different auction includes only the plurality of winners.

10. The product of claim 8 wherein determining that the first content item and the second content item each have respective bids specified for load order further includes identifying respective campaigns for the first content item and the second content item that each include a designation to compete in the selection for load order and specify the respective bid of the first content item or the second content item.

11. A system comprising: one or more processors; and
one or more memory elements including instructions that when executed cause the one or more processors to:

identify a plurality of winners of a first selection process for displaying content in a block including identifying first and second content items and a placement of the first and second content items in the block, the placement indicating a highest position in the block for the first content item and a next highest position in the block for the second content item;

determine that the first content item and the second content item each have a respective bid specified for a load order for the block;

determine a first media type of the first content item and a second media type of the second content item;

determine whether the first media type and the second media type are both text;

in response to determining that one or both of the first media type and the second media type are not text, determine to perform the selection for load order;

conduct a selection for load order based on the respective bids of the first content item and the second content item including determining that a respective bid for the second content item is greater than a respective bid for the first content item;

determine that the second content item is a winner of the selection based on the determination that the respective bid for the second content item is greater than the respective bid for the first content item;

enable rendering of content for presentation such that the second content item that is to be positioned in the next highest position is instead rendered in the highest position before the first content item when the block is rendered on a user device, the enabling including modifying HTML (Hyper Text Markup Language) code included in the block to include a DIV (Division) tag for the second content item; and charge a content sponsor of the second content item based at least in part on the respective bids of the first content item and the second content item, wherein the selection for load order is not performed if both the first media type and the second media type are text.

12. The system of claim 11 wherein the first selection process is a first auction and wherein the selection for load order is a second, different auction, the first auction including one or more participants from inventory and the first and second content items and wherein the second, different auction includes only the plurality of winners.

13. The system of claim 11 wherein determining that the first content item and the second content item each have respective bids specified for load order further includes identifying respective campaigns for the first content item and the second content item that each include a designation to compete in the selection for load order and specify the respective bid of the first content item or the second content item.

* * * * *

UNITED STATES PATENT AND TRADEMARK OFFICE
CERTIFICATE OF CORRECTION

| | |
|---|---|
| PATENT NO. | : 10,089,656 B1 |
| APPLICATION NO. | : 14/332574 |
| DATED | : October 2, 2018 |
| INVENTOR(S) | : Sanio et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1044 days.

Signed and Sealed this
Sixteenth Day of July, 2019

Andrei Iancu
*Director of the United States Patent and Trademark Office*